United States Patent
Plett

(10) Patent No.: US 6,731,415 B1
(45) Date of Patent: May 4, 2004

(54) MULTI-APERTURE HOLOGRAPHIC OPTICAL ELEMENT FOR USE IN A FREE SPACE OPTICAL COMMUNICATION SYSTEM

(75) Inventor: Mark L. Plett, Redmond, WA (US)

(73) Assignee: Terabeam Corporation, Kirkland, WA (US)

( * ) Notice: Subject to any disclaimer, the term of this patent is extended or adjusted under 35 U.S.C. 154(b) by 106 days.

(21) Appl. No.: 10/109,716

(22) Filed: Mar. 28, 2002

(51) Int. Cl.$^7$ ................................................. G02B 5/32
(52) U.S. Cl. ........................... 359/15; 359/19; 359/1; 398/118; 398/128; 398/129; 398/130; 398/135
(58) Field of Search ....................... 359/19, 15, 1, 359/34, 84, 118, 122, 128–131, 135, 138; 398/118, 122, 128–131, 135, 138, 84

(56) References Cited

U.S. PATENT DOCUMENTS

| | | | |
|---|---|---|---|
| 5,218,654 A | * | 6/1993 | Sauter ........................ 385/24 |
| 5,296,950 A | * | 3/1994 | Lin et al. ...................... 359/9 |
| 5,475,670 A | * | 12/1995 | Hamada et al. ........ 369/112.07 |
| 5,706,114 A | * | 1/1998 | Erteza ...................... 398/131 |
| 5,933,551 A | | 8/1999 | Boudreau et al. |
| 6,154,297 A | | 11/2000 | Javitt et al. |
| 6,185,015 B1 | * | 2/2001 | Reinhorn et al. ............. 359/15 |
| 6,269,203 B1 | | 7/2001 | Davies et al. |
| 6,320,686 B1 | | 11/2001 | Schairer |
| 6,344,829 B1 | | 2/2002 | Lee |
| 6,347,001 B1 | | 2/2002 | Arnold et al. |
| 2003/0147652 A1 | * | 8/2003 | Green et al. ................ 398/118 |

* cited by examiner

Primary Examiner—Drew Dunn
Assistant Examiner—Fayez Assaf
(74) Attorney, Agent, or Firm—Blakely Sokoloff Taylor & Zafman, LLP

(57) ABSTRACT

A holographic element (HOE) with multiple apertures formed in a single substrate for use an optical communication system. The multi-aperture HOE can be use instead of an optics unit having one or more separate optical elements for each aperture needed by an optical transmitter, receiver or transceiver. The single substrate reduces complexity and cost relative to conventional system that the use separate optical elements to implement the optics unit.

25 Claims, 2 Drawing Sheets

MULTI-APERTURE HOLOGRAPHIC OPTICAL ELEMENT FOR USE IN A FREE SPACE OPTICAL COMMUNICATION SYSTEM

CROSS-REFERENCE TO RELATED APPLICATIONS

The present application is related to U.S. patent application Ser. No. 09/886,246, entitled "Internal Reflection Apparatus and Method Using a Holographic Optical Element for a Free Space Optical Communication System" filed Jun. 20, 2001.

FIELD OF THE INVENTION

The field of invention relates generally to optical communication systems; and in particular but not exclusively, relates to holographic optical elements for use in optical communication systems.

BACKGROUND

With increasing popularity of wide area networks such as the Internet and/or World Wide Web, network growth and traffic have experienced tremendous growth. Network users continue to desire faster networks, which may be difficult to achieve using existing wired technologies.

An alternative to wired network solutions is a wireless or free space optical (FSO) communication technology. Such FSO systems can use beams of light, such as laser beams, as optical communication signals, and therefore do not require cables or fibers connected between transmitters and receivers.

FSO units (i.e., FSO transmitters, receivers, and transceivers) used in FSO communication systems typically include several separate optical elements for transmission, reception, tracking and acquisition of FSO signals. For example, some FSO units have multiple apertures, each having a lens. Other FSO units may have a single aperture with a lens and multiple beam splitters. Because these optical elements are relatively expensive, the cost of such a unit increases as more optical elements are incorporated into the unit. Further, these optical elements typically require relatively complex mechanisms to provide needed optical isolation between elements, which further increases costs (including design costs). In addition, as more optical elements are used in a unit, alignment and maintenance of the unit becomes more complex, thereby increasing costs and the "downtime" in maintaining the unit Such increased costs and downtime are undesirable in many applications.

SUMMARY OF THE INVENTION

In accordance with aspects of the present invention, a holographic element (HOE) with multiple apertures formed in a single substrate is provided for use in an optical communication system. In one aspect, the multi-aperture HOE can be used instead of a conventional optics unit having one or more separate optical elements for each aperture. For example, the multi-aperture HOE can include a reception aperture and a tracking aperture for use in an optical receiver unit or transceiver unit. Because a single substrate is used to implement the apertures, multiple apertures can be provided for the optical unit with reduced complexity and cost relative to conventional systems that use separate optical elements to implement the optics unit.

In another aspect, the multi-aperture HOE includes a transmission aperture. In one embodiment, the transmission aperture is implemented with multiple component apertures. Multiple component transmission apertures can reduce scintillation of the transmitted optical signal. This aspect provides a relatively simple and inexpensive mechanism to reduce scintillation.

In yet another aspect, the multi-aperture HOE includes transmission and reception apertures for use in an optical transceiver.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

An optical communication system according to an embodiment of the present invention has two optical units for transmitting and receiving a FSO signal. In a typical operation of the optical communication system, one optical unit transmits an FSO signal containing communication information. The other optical unit receives the .FSO signal. The receiving optical unit includes a communications detector for extracting the communication information from the received optical signal, and a tracking detector used in maintaining alignment between the receiving optical unit and the FSO signal. In an embodiment of the present invention, the receiving optical unit includes a multi-aperture HOE to direct portions of the FSO signal to the communications and tracking detectors. Embodiments of optical units and multi-aperture HOEs according to the present invention are described below.

Figure 1:
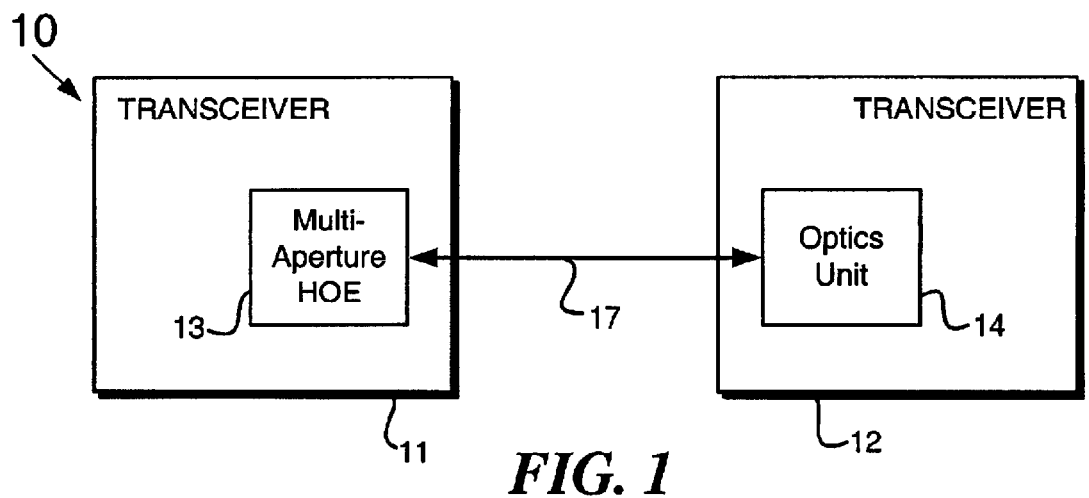
FIG. 1 is a block a diagram illustrating a free space optical (FSO) communication system with a multi-aperture holographic optical element (HOE), according to one embodiment of the present invention.

FIG. 1 illustrates a FSO communication system 10, according to one embodiment of the present invention. In this embodiment, FSO communication system 10 includes transceivers 11 and 12. Although only two transceivers are shown, other embodiments of FSO communication system 10 may include additional transceivers, transmitters and/or receivers. In addition, in other embodiments, a FSO transmitter or FSO receiver can be used instead of transceivers (e.g., in a unidirectional communication systems).

In accordance with the embodiments of the present invention, transceiver 11 includes a multi-aperture HOE 13. Multi-aperture HOE 13 is used in place of a conventional optics unit in this embodiment. Transceiver 12 includes an optics unit 14, which can be a conventional optics unit as described above, or a multi-aperture HOE similar to multi-aperture HOE 13.

In one embodiment, transceivers 11 and 12 are similar to known FSO transceivers that do not include multi-aperture HOEs, available from Terabeam Corp., Kirkland, Washington. However, transceiver 11 includes multi-aperture HOE 13 (instead of a conventional optics unit) that provides apertures used for various functions of transceiver 11 that can include, for example, transmission, reception, tracking and acquisition.

Transceiver 11 is operatively coupled to transceiver 12 in that these transceivers communicate with each other via a FSO signal indicated by a double-headed arrow 17 (hereinafter FSO signal 17). More particularly, in this embodiment multi-aperture HOE 13 of transceiver 11 is operatively coupled to optics unit 14 of transceiver 12 via FSO signal 17. In some instances, for example, transmitter 11 transmits FSO signal 17 while in other instances transceiver 12 transmits FSO signal 17. Although these transmissions are described as being unidirectional at a given instant, in some embodiments FSO signal 17 includes two unidirectional FSO signals, one from transceiver 11 and one from transceiver 12 that transceivers 11 and 12 may transmit simultaneously.

In basic operation during a receive mode, transceiver 11 can receive FSO signal 17 from optical receiver 12. As previously described, FSO signal 17 can be in the form of a laser beam having data modulated thereon. For example, FSO signal 17 may be a laser beam with a wavelength ranging between 500 nm and 2000 nm that is modulated using OOK (on-off keying) modulation, as is commonly used in optical communication systems. Other embodiments may use differently modulation techniques and/or radiation of different wavelengths that are suitable for the intended application.

Transceiver 11 can use a portion of FSO signal 17 in demodulating the signal to extract the data, as Is commonly done in conventional optical receivers. Typically, a relatively large portion of the incoming optical signal is used to extract the data. In one embodiment, multi-aperture HOE 13 includes a reception aperture (e.g., see FIG. 2) to receive this portion of FSO signal 17. For example, the reception aperture may implement a holographic focusing element to focus the portion of FSO signal 17 onto a communications detector (e.g., a photodiode or other suitable photodetector).

In addition, transceiver 11 can use another portion of FSO signal 17 in tracking FSO signal 17 to help in maintaining alignment between transceiver 11 and FSO signal 17. In this embodiment, multi-aperture HOE 13 includes a tracking aperture to receive this other portion of FSO signal 17. For example, the tracking aperture may implement a holographic focusing element to focus the portion of FSO signal 17 onto a tracking detector (e.g., a quad cell detector).

In basic operation during a transmit mode, transceiver 11 can transmit FSO signal 17 to transceiver 12. In one embodiment, multi-aperture HOE 13 includes a transmission aperture (e.g., see FIG. 2) to transmit FSO signal 17. For example, transmission aperture may implement a holographic focusing element to collimate FSO signal 17 as it leaves transceiver 11.

Multi-aperture HOE 13 provides several advantages over the previously described conventional optics units. For example, a single unit is used to aggregate several optical elements, thereby tending to reduce cost and complexity. In addition, because HOEs can be manufactured using photolithographic techniques, alignment and sizing of the apertures can be precisely controlled at manufacture. Still further, optical designs can be easily implemented by a relatively simple change in the HOE exposure process. Further, installation of a replacement HOE (for example, due to updated design or to replace a damaged HOE) can be relatively easy because the HOE can more easily be designed to match the size and shape of the original HOE.

Figure 2:
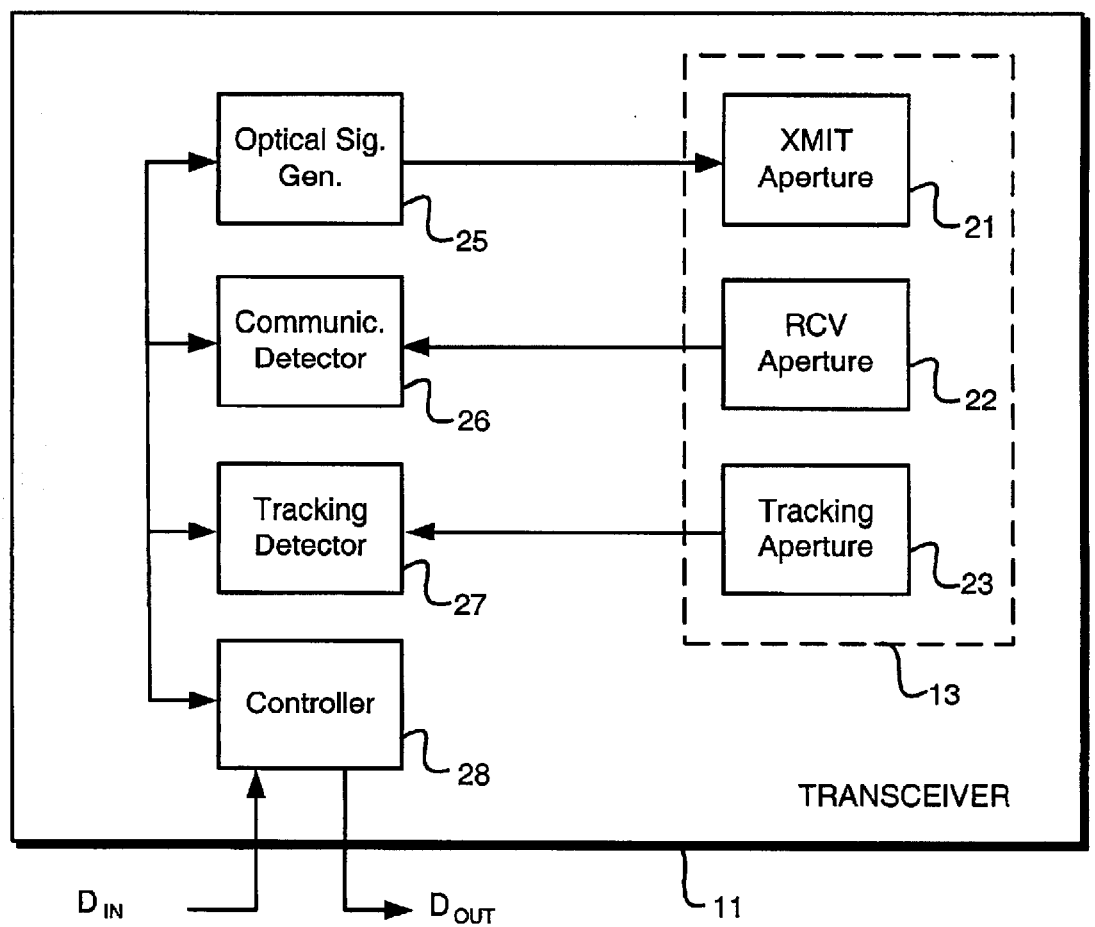
FIG. 2 is a block diagram illustrating a FSO transceiver, according to one embodiment of the present invention.

FIG. 2 illustrates FSO transceiver 11 (FIG. 1) in more detail, according to one embodiment of the present invention. In this embodiment, multi-aperture HOE 13 includes a transmission aperture 21, a reception aperture 22 and a tracking aperture 23. As previously described, apertures 21–23 may be holographic interference patterns that implement optical elements such as, for example, focusing lens, collimating lens, etc. In addition, these apertures may be implemented as multiple component apertures. For example, transceiver 11 may transmit an optical signal to transceiver 12 (FIG. 1) via several apertures distributed across the face of multi-aperture HOE 13.

In addition, this embodiment of FSO transceiver 11 includes an optical signal generator 25, a communications detector 26, a tracking detector 27 and a controller 28. In one embodiment, optical signal generator 25 is a laser generating a laser beam having a wavelength of 1540 nm. Communications detector 26, in one embodiment, is implemented using a photodiode such as, for example, a PIN photodiode, or an avalanche photodiode (APD). Tracking detector 27 is implemented using a multi-cell detector such as a quad cell detector in some embodiments. In other embodiments, tracking detector can be implemented with other types of optical position sensors devices such as charge-coupled device (CCD) array or Photo-detector Array (PDA). Controller 28, in this embodiment, is implemented with one or more processors (not shown) and a memory (not shown). The processor(s) can be, for example, a general-purpose microprocessor, microcontroller or digital signal processor. The memory can store data and instructions (e.g., computer programs) used by the processor(s) to control the operation of transceiver 11.

The elements of this embodiment of transceiver 11 are interconnected as follows. Optical signal generator 25, communications detector 26 and tracking detector 27 are operatively coupled to transmission aperture 21, reception aperture 22 and tracking aperture 23, respectively. For example, optical signal generator 25 is operatively coupled to transmission aperture 21 in that optical signal generator 25 is arranged to provide an optical signal to transmission aperture 21. In addition, controller 28 is coupled to optical signal generator 25, communications detector 26 and tracking detector 27.

In operation during a transmit mode, optical signal generator 25 generates an optical signal and directs it to transmission aperture 21. In one embodiment, transmission aperture 21 launches the optical signal Into free space.

For example, controller 28 can be configured to cause optical signal generator 25 to embed or modulate data (e.g., data $D_{IN}$ in FIG. 2) in the optical signal generated by optical signal generator 25, as is commonly done in known optical transceivers.

In operation during a receive mode, communications detector 26 receives an optical signal via reception aperture 22. For example, the optical signal from reception aperture 22 can be a portion of FSO signal 17 (FIG. 1) transmitted by transceiver 12 (FIG. 1). In this embodiment, reception aperture 22 is configured to focus the received optical signal onto communications detector 26.

In addition, tracking detector 27 receives an optical signal via tracking aperture 23. The optical signal from tracking aperture 23 can be another portion of FSO signal 17 (FIG. 1) transmitted by transceiver 12 (FIG. 1). In this embodiment, tracking aperture 23 is configured to focus the received optical signal onto tracking detector 27.

In one embodiment, controller 28 can be configured to extract communications (e.g., data DOUT in FIG. 2) and tracking information from the output signals of communications detector 26 and tracking detector 27, as is common done in known optical transceivers. Controller 28 can use the tracking information to maintain alignment between transceiver 11 and FSO signal 17 (FIG. 1).

Figure 3:
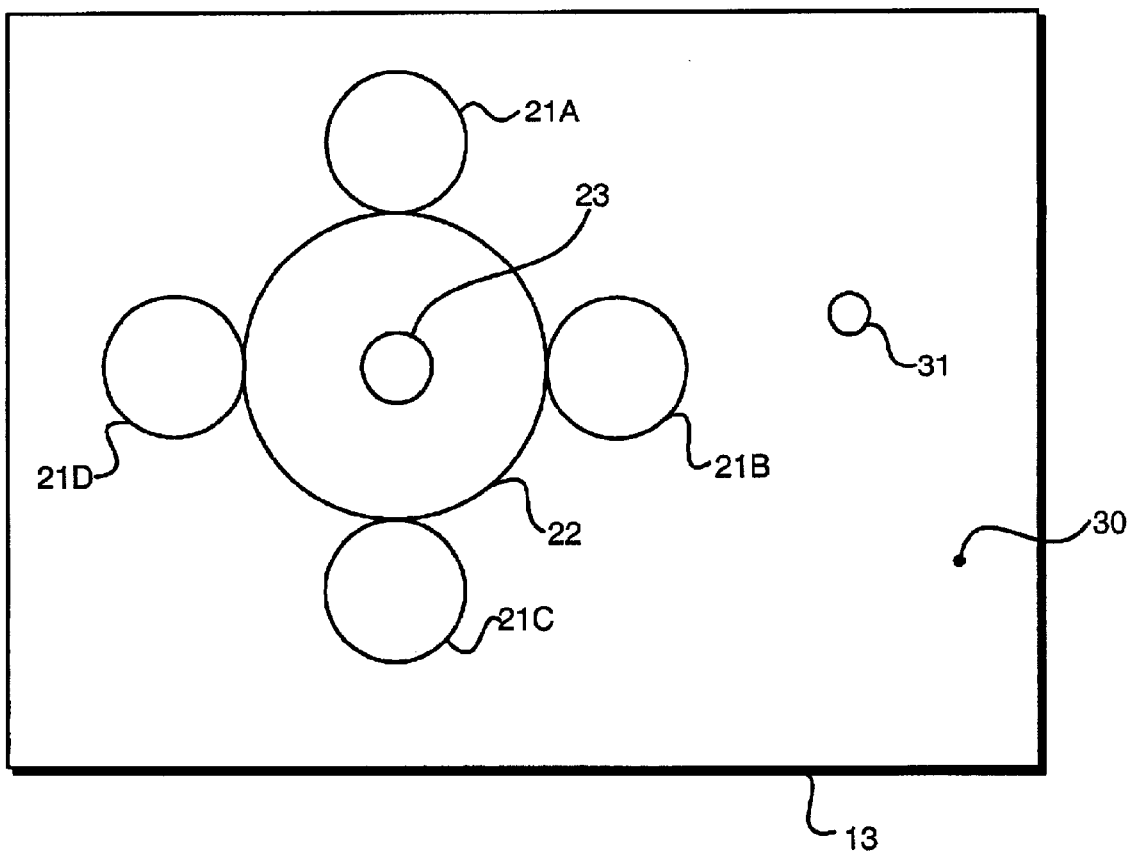
FIG. 3 is a diagram illustrating a layout of a multi-aperture HOE, according to one embodiment of the present invention.

FIG. 3 illustrates a layout of multi-aperture HOE 13, according to one embodiment of the present invention. In this embodiment, multi-aperture HOE 13 is formed (or recorded) in a single substrate 30. Various materials can be used for substrate 30 such as, for example, photopolymer materials, dichromated gelatins or other optical gelatins. Such materials are commercially available. Holograms implementing the various apertures are then recorded in substrate 30.

For example, in one embodiment, substrate 30 is masked so that only the intended aperture will be exposed during the recording process. In the recording process, a reference beam and an information beam are directed to the substrate, thereby recording an interference pattern in the substrate. The interference pattern can implement a diffraction grating, for example in the substrate. This diffraction grating can be designed, for example, to diffract incident light of a selected wavelength toward a focus, thereby implementing a lens. Other optical elements can be designed in a similar manner. This process can then be repeated for each aperture.

In this embodiment of multi-aperture HOE 13, the receiving surface of reception aperture 22 has an annular shape. Tracking aperture 23 is recorded in the central void area of this annulus. This arrangement can be advantageously used in systems in which the received beam has a central peak in its energy distribution (e.g., a Gaussian distribution). This will provide a uniform energy distribution on the tracking sensor. This will reduce errors in the tracking system due to non-uniform illumination of the tracking sensor. In other embodiments, reception and/or tracking apertures 22 and 23 may have different shapes and/or locations on substrate 30.

In this embodiment, transmission aperture 21 (FIG. 2) is implemented with four component apertures 21A–21D. Component apertures 21A–21 D are uniformly distributed around the periphery of reception aperture 22. Such a distributed transmission aperture can advantageously reduce scintillation of the transmitted optical signal as received by transceiver 12 (FIG. 1). Although component apertures 21A–21D are shown in a symmetrical arrangement about reception aperture 22, in other embodiments, component apertures may be disposed in other arrangements and/or locations on substrate 30.

In addition, in this embodiment, multi-aperture HOE 13 includes a spotting aperture for use in a spotting scope (not shown). In one embodiment, this spotting scope could be implemented with a piano-convex lens bonded to the HOE substrate, which images the field of view onto a CCD array. Such a spotting scope can be used during installation of transceiver 11 to initially point transceiver 11 at transceiver 12 (FIG. 1). This process is also referred to herein as the acquisition process.

Embodiments of methods and apparatus for multi-aperture HOEs and FSO optical units are described herein. In the above description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A transceiver for use in a free space optical system, the transceiver comprising:
   a holographic optical element having a substrate with a first aperture, a second aperture and a third aperture;
   an optical signal generator operatively coupled to the first aperture;
   a communications detector operatively coupled to the second aperture;
   a tracking detector operatively coupled to the third aperture; and
   a controller coupled to the optical signal generator, the communications detector and the tracking detector.

2. The transceiver of claim 1 wherein the substrate further includes a fourth aperture operatively couplable to a spotting scope.

3. The transceiver of claim 1 wherein the first aperture comprises a plurality of component apertures.

4. The transceiver of claim 1 wherein a receiving surface of the second aperture at least partially surrounds the third aperture.

5. The transceiver of claim 1 wherein an aperture of the HOE includes a holographic focusing element.

6. A receiving unit for use in a free space optical system, the receiving unit comprising:
   a holographic optical element having a substrate with a first aperture and a second aperture;
   a communications detector operatively coupled to the first aperture; and
   a tracking detector operatively coupled to the second aperture.

7. The receiving unit of claim 6 wherein the first aperture has an annular receiving area.

8. The receiving unit of claim 7 wherein the second aperture is located within a central portion of the annular receiving area.

9. The receiving unit of claim 6 further comprising a controller coupled to the communications detector and the tracking detector.

10. The receiving unit of claim 6 wherein the receiving unit is disposed in a transceiver.

11. The receiving unit of claim 6 wherein the holographic optical element further includes a third aperture operatively couplable to a spotting scope.

12. A transceiver for use in a free space optical system, the transceiver comprising:
   holographic means for directing optical communication signals, the holographic means having a substrate with a first aperture, a second aperture and a third aperture;

an optical signal generator operatively coupled to the first aperture;

a communications detector operatively coupled to the second aperture;

a tracking detector operatively coupled to the third aperture; and a controller coupled to the optical signal generator, the communications detector and the tracking detector.

13. The transceiver of claim 12 wherein the first aperture comprises a plurality of component apertures.

14. The transceiver of claim 12 wherein the second aperture comprises a plurality of component apertures.

15. The transceiver of claim 12 wherein the third aperture comprises a plurality of component apertures.

16. The transceiver of claim 12 wherein the third aperture comprises a plurality of component apertures.

17. The transceiver of claim 12 wherein the first, second and third apertures each include a holographic focusing element.

18. The system of claim 17 wherein the first aperture has an annular receiving area.

19. The system of claim 17 further comprising a controller coupled to the communications detector and the tracking detector.

20. The transceiver of claim 12 wherein the substrate of the holographic means further includes a fourth aperture operatively couplable to a spotting scope.

21. An free space optical communication system, comprising:

a first optical unit to provide a free space optical (FSO) signal; and a second optical unit arranged to receive the FSO signal via free space from the first optical unit, wherein the second optical unit includes a communications detector, a tracking detector, and a holographic optical element (HOE) having a substrate with a first aperture and a second aperture, the first and second apertures operatively coupled to the communications and tracking detectors, respectively.

22. The system of claim 21 wherein the HOE further includes a third aperture to transmit an optical signal from the second optical unit into free space.

23. The system of claim 21 wherein the second aperture is located within a central portion of an annular receiving area.

24. The system of claim 23 wherein the third aperture comprises a plurality of component apertures.

25. The system of claim 23 wherein the second optical unit further comprises an optical signal generator operatively coupled to a third aperture.

* * * * *